(12) United States Patent
Sailler

(10) Patent No.: US 11,788,801 B2
(45) Date of Patent: Oct. 17, 2023

(54) HEAT EXCHANGER AND AN ADDITIVE MANUFACTURING METHOD FOR MANUFACTURING A HEAT EXCHANGER

(71) Applicant: VOLVO TRUCK CORPORATION, Gothenburg (SE)

(72) Inventor: Yannick Sailler, Lyons (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 378 days.

(21) Appl. No.: 16/753,604

(22) PCT Filed: Oct. 13, 2017

(86) PCT No.: PCT/IB2017/001434
§ 371 (c)(1),
(2) Date: Apr. 3, 2020

(87) PCT Pub. No.: WO2019/073277
PCT Pub. Date: Apr. 18, 2019

(65) Prior Publication Data
US 2020/0333089 A1     Oct. 22, 2020

(51) Int. Cl.
*F28F 9/007* (2006.01)
*F28D 9/00* (2006.01)
(Continued)

(52) U.S. Cl.
CPC .......... *F28F 9/0075* (2013.01); *F28D 9/0062* (2013.01); *F28D 9/04* (2013.01);
(Continued)

(58) Field of Classification Search
CPC .. F28F 3/04; F28F 9/0075; F28D 7/02; F28D 7/022; F28D 7/04; F28D 9/0012; F28D 9/0062; F28D 9/04
See application file for complete search history.

(56) References Cited

U.S. PATENT DOCUMENTS 2,384,251 A * 9/1945 Hill ..................... F04D 29/584
165/104.31
2,892,618 A * 6/1959 Holm ..................... F28F 3/022
165/185
(Continued)

FOREIGN PATENT DOCUMENTS

CN       107210117 A     9/2017
EP       3062054 A1      8/2016
(Continued)

OTHER PUBLICATIONS

WO-2015181846-A1—English machine translation (Year: 2015).*
(Continued)

*Primary Examiner* — Travis Ruby
*Assistant Examiner* — Christopher C Pillow
(74) *Attorney, Agent, or Firm* — Venable LLP; Jeffri A. Kaminski

(57) ABSTRACT

A heat exchanger body includes at least a first channel wall portion, a second channel wall portion, and a third channel wall portion. A first channel for a first fluid, and a second channel for a second fluid are provided such that heat is allowed to be transferred between the first channel and the second channel via the second channel wall portion. A plurality of first support structures are arranged in the first channel and extend from the first channel wall portion to the second channel wall portion. A plurality of second support structures are arranged in the second channel and extending from the second channel wall portion to the third channel wall portion. The support structures are configured to support the second and third channel wall portions during manufacturing of the heat exchanger.

16 Claims, 4 Drawing Sheets

(51) Int. Cl.
*F28D 9/04* (2006.01)
*B33Y 80/00* (2015.01)
*F28D 21/00* (2006.01)

(52) U.S. Cl.
CPC ....... *B33Y 80/00* (2014.12); *F28D 2021/0082* (2013.01); *F28F 2255/00* (2013.01)

(56) References Cited

U.S. PATENT DOCUMENTS

| | | | | |
|---|---|---|---|---|
| 4,183,403 A | | 1/1980 | Nicholson | |
| 4,360,059 A | * | 11/1982 | Funke | F28D 7/026 165/184 |
| 4,431,488 A | * | 2/1984 | Hemmerich | G21B 1/13 376/136 |
| 5,445,216 A | * | 8/1995 | Cannata | F28D 11/02 165/165 |
| 5,655,600 A | * | 8/1997 | Dewar | F28D 9/0062 165/DIG. 356 |
| 5,845,399 A | | 12/1998 | Dewar et al. | |
| 6,622,786 B1 | * | 9/2003 | Calmidi | H01L 23/3677 165/122 |
| 8,616,269 B2 | * | 12/2013 | Besant | F28F 3/022 165/150 |
| 9,291,404 B2 | * | 3/2016 | Tamura | F28F 3/086 |
| 2005/0058535 A1 | * | 3/2005 | Meshenky | F28F 13/06 415/121.3 |
| 2008/0149313 A1 | * | 6/2008 | Slaughter | B22F 10/20 430/269 |
| 2009/0145581 A1 | * | 6/2009 | Hoffman | F28F 3/14 165/80.3 |
| 2015/0300745 A1 | * | 10/2015 | Kolb | F28D 7/022 165/184 |
| 2016/0018167 A1 | * | 1/2016 | Dziubinschi | F28F 3/044 165/177 |
| 2016/0025421 A1 | | 1/2016 | Rippel et al. | |
| 2016/0230595 A1 | * | 8/2016 | Wong | B23P 15/26 |
| 2016/0363387 A1 | | 12/2016 | Stapleton | |
| 2017/0030651 A1 | | 2/2017 | Rock, Jr. et al. | |
| 2017/0205146 A1 | | 7/2017 | Turney et al. | |

FOREIGN PATENT DOCUMENTS

| | | | | |
|---|---|---|---|---|
| EP | 3062055 A1 | | 8/2016 | |
| EP | 3269474 A1 | | 1/2018 | |
| KR | 100880454 B1 | | 1/2009 | |
| WO | WO-2015181846 A1 | * | 12/2015 | F23G 7/06 |

OTHER PUBLICATIONS

European Communication under Rule 71(3) EPC dated Feb. 19, 2021 in corresponding European Patent Application No. 17805255.1, 39 pages.

International Search Report and Written Opinion dated Jun. 28, 2018 in corresponding International PCT Application No. PCT/IB2017/001434, 10 pages.

China Office Action dated Dec. 2, 2020 in corresponding China Patent Application No. 201780095740.X, 10 pages.

\* cited by examiner

HEAT EXCHANGER AND AN ADDITIVE MANUFACTURING METHOD FOR MANUFACTURING A HEAT EXCHANGER

CROSS-REFERENCE TO RELATED APPLICATIONS

This application is a U.S. National Stage application of PCT/IB2017/001434, filed Oct. 13, 2017 and published on Apr. 18, 2019 as WO/2019/073277A1, all of which is hereby incorporated by reference in its entirety.

TECHNICAL FIELD

The invention relates to the field of heat exchangers, for example heat exchanger used for cooling purposes in a vehicle, such as e.g. cooling of the combustion engine in heavy-duty vehicles, such as trucks, buses and construction equipment, e.g. wheel loaders, articulated haulers, excavators and backhoe loaders. The heat exchanger may also be used for heating purposes, by heating of a heat transfer fluid in the heat exchanger. The invention also relates to the manufacturing of a heat exchanger.

BACKGROUND

A heat exchanger is a device which transfers heat, most often between two heat transfer fluids, e.g. in such a way that a first fluid transfers heat to a second fluid. The heat transfer fluids may be gases or liquids. The main purpose of the heat exchanger may be to satisfy a heating need, i.e. to heat one of the heat transfer fluids, or to satisfy a need for cooling, i.e. to cool one of the heat transfer fluids.

In a vehicle, heat exchangers are used, for example, for the engine of the vehicle in order to cool fresh air charged by means of an exhaust gas turbocharger. The fresh air to be cooled is introduced into the heat exchanger, where it thermally interacts with a heat transfer medium (i.e. a coolant). The heat exchanger and the heat transfer medium are arranged in such a way that heat is transferred from the fresh air to the heat transfer medium, such that the air is cooled.

Moreover, in a vehicle, the engine, typically a combustion engine, requires cooling and thus comprises a cooling circuit. The cooling circuit comprises e.g. a so-called high temperature main circuit used to cool and to regulate the temperature of the combustion engine. Thus, the main circuit comprises a heat exchanger configured for removing the heat produced by the engine and to transfer it to the heat transfer medium (i.e. the coolant). The main circuit may further be equipped with a pump configured to adapt the rate of flow of the coolant through the circuit.

The cooling circuit may also be used for various other applications and, in particular, to cool various pieces of equipment in the vehicle, e.g. the condenser of the air-conditioning circuit, the oil heat exchanger in the engine cooling oil circuit, the gearbox cooling oil circuit, and the circuit that recirculates the exhaust gases, also known as the EGR (Exhaust Gas Recirculation) circuit.

The heat exchangers of the vehicle may, for example, be designed as a plate heat exchanger having a plurality of plate pairs stacked one on top of each other to form a coolant path through which a coolant may be passed. In a distance formed between two adjacent plate pairs, the medium to be cooled, for example, charged air, or cooling liquid can be guided in order to transfer heat to the coolant. Other types of heat exchangers are e.g. tubular heat exchangers or a shell and tube heat exchangers, which consist of a plurality of tubes. In a shell and tube heat exchanger, a first heat transfer fluid flows in the plurality of tubes, and a second heat transfer fluid flows over the tubes in order to transfer heat or receive heat from the first heat transfer medium in the tubes.

The heat exchangers in the vehicle are often relatively small and comprise relatively complex structures and/or delicate components. There are various ways to manufacture the heat exchangers, e.g. the separate production of heat exchanger plates or tubes, by e.g. casting, and the subsequent assembling of the plates and tubes into a complete heat exchanger. The cost of such manufacturing tends to be high and the manufacturing typically involves complex assembly and difficult attachment, brazing, soldering, and/or welding operations of the various parts of the heat exchangers. Lately, additive manufacturing has been used to manufacture complex, and small details and components of the heat exchangers, such as descried e.g. in EP 3 062 054.

SUMMARY

In view of the above-mentioned and other drawbacks of the prior art, the object of the present inventive concept is to provide a heat exchanger which provides an efficient heat transfer between a first and a second fluid. According to a first aspect of the invention, the object is achieved by a heat exchanger according to claim 1.

The present invention is based on the insight that support structures, which are used to support different walls and wall portions of the heat exchanger body during manufacturing of the heat exchanger, may be used in the respective channels of the heat exchanger in order to improve the performance of the heat exchanger (i.e. to increase the heat transfer and/or to reduce pressure drop), and may thus not need to be removed after the heat exchanger has been manufactured. More specifically, and according to some embodiments of the invention, the support structures are designed in a fluid flow desirable way.

According to the first aspect of the invention, the heat exchanger comprises:

a heat exchanger body comprising at least a first channel wall portion, a second channel wall portion, and a third channel wall portion, a first channel defining a first fluid path for a first fluid, said first channel having a first channel height extending from said first channel wall portion to said second channel wall portion;

a second channel defining a second fluid path for a second fluid, said second channel having a second channel height extending from said second channel wall portion to a third channel wall portion such that heat is allowed to be transferred between the first channel and the second channel via said second channel wall portion;

a plurality of first support structures arranged in said first channel and extending from said first channel wall portion to said second channel wall portion, and a plurality of second support structures arranged in said second channel and extending from said second channel wall portion to said third channel wall portion, wherein said plurality of first support structures are configured to support said second wall portion in said first channel, and that said plurality of second support structures are configured to support said third channel wall portion in said second channel, during manufacturing of the heat exchanger.

By the provision of a heat exchanger comprising support structures in the first and second channels, the means which are used during manufacturing of the heat exchanger, i.e. the support structures, are used to affect the fluid flow in the first and second channels in a desirable way. Hence, said plurality of first support structures are configured to support said second wall portion in said first channel and is configured to affect the fluid flow of the first fluid in a desirable way, e.g. to increase turbulence and/or to reduce pressure drop in the first channel. Correspondingly, said plurality of second support structures are configured to support said third channel wall portion in said second channel and is configured to affect the fluid flow of the second fluid in a desirable way, e.g. to increase turbulence and/or to reduce pressure drop in the second channel. Thus, the support structures in the first and second channels need not to be removed once the heat exchanger has been manufactured, as they are used to improve the properties of the heat exchanger. Hence, the drawback of the manufacturing process (i.e. a manufacturing process which requires support structures in order to manufacture the different parts and portions of the heat exchanger, e.g. elongated channels and tubes, in a desirable manner) is used as an advantage in order to affect the fluid flow in a desirable way. Further, the support structures may transfer heat between the first channel and the second channel, i.e. between the first and the second fluids, and thus increase the area available for heat transfer in the heat exchanger.

It should be noted that the first and the second fluid may be referred to as a first and second heat transfer fluid, respectively. Typically, one of the first and second fluids transfers heat to the other one of the first and second fluids. Hence, the first and the second fluids transfer heat, and may be a liquid such as e.g. oil or water, or may be a gas, such as e.g. air. According to one embodiment, the second fluid in the second channel is used for cooling the first fluid in the first channel.

According to one embodiment, the plurality of first support structures are configured to reduce the pressure drop of the first fluid in the first channel. According to one embodiment, the plurality of second support structures are configured to reduce the pressure drop of the second fluid in the second channel. The support structures may thus be sized and shaped in a fluid dynamically beneficial way, e.g. by that the respective support structure has a main extension in the same direction of the fluid flow, or at least within 45° of the direction of the fluid flow or main direction of the respective channel. Additionally or alternatively, the respective support structure may have a curved or rounded outer surface which guides and directs the fluid around the support structure in fluid flow desirable way.

It should be understood that the first channel is adjacent the second channel. However, the first and the second channel need not to be straight channels, but may have any suitable shape desirable for use in a heat exchanger. In other words, the first channel and the second channel shares the second channel wall portion as a common channel wall portion, and heat may be transferred through the second channel portion in order to exchange heat between the first and second channels. In more detail, the second channel wall portion comprises a first side, or a first channel wall side, facing said first channel, and comprises a second side, or a second channel wall side, facing said second channel. The first and the second sides may, but do not need to, be parallel to each other.

According to one embodiment, the first channel may be arranged to guide the first fluid, wherein the first fluid is adapted to release heat to the second fluid. Hence, the first channel, and the plurality of first support structures, directs and guides and possibly stirs the first fluid in such a way that heat is transferred from the first fluid to the second wall portion (more specifically, the first side of the second wall portion), by e.g. convective heat transfer. The heat is subsequently transferred by conduction through the second channel wall portion, and is then received by the second fluid in the second channel by e.g. convective heat transfer. Heat may additionally be transferred through the support structures, e.g. by the procedure of convective heat transfer of the first fluid to the first support structures, by subsequent conductive heat transfer through the first support structures to the second wall portion, and subsequently convective heat transfer to the second fluid from the second wall portion and/or further conductive heat transfer to the second support structures and subsequent convective heat transfer to the second fluid from the second support structures. According to one embodiment, the second channel may provide cooling using a coolant media as the second fluid, adapted to cool the first fluid in the first channel.

It should be noted that the heat exchanger according to the invention is not limited to two channels (the first and second channels), but may comprises a plurality of channels and associated support structures, corresponding to the first and second channels and associated first and second support structures.

It should further be noted that the terms "plurality of first support structures" and simply "first support structures" are used interchangeably throughout the application text. Correspondingly, the terms "plurality of second support structures" and simply "second support structures" are used interchangeably throughout the application text. Moreover, the plurality of first support structures and the plurality of second support structures may simply be referred to as "the support structures".

According to one embodiment, the first and the second channels are arranged in a counter current flow arrangement. That is, the first fluid and the second fluid in the first and second channels, respectively, flow in opposite directions. Hereby, heat may be transferred in a desirable way. According to one alternative embodiment, the first and the second channels are arranged in a co-current flow arrangement. That is, the first fluid and the second fluid in the first and second channels, respectively, flow in the same direction.

Hereby, the heat transfer in the heat exchanger may be adapted accordingly. According to another alternative embodiment, in some portions of the heat exchanger, the first and the second channels are arranged in a counter current flow arrangement, and in other portions of the heat exchanger, the first and the second channels are arranged in a co-current flow arrangement. Moreover, and according to one embodiment, the heat exchanger may be a plate heat exchanger in which the respective channel is formed between two adjacent plates, or the heat exchanger may be a tubular heat exchanger in which the respective channel is formed in a tube, or a shell and tube heat exchanger in which e.g. the first channel is comprised in a tube (or a plurality of first channels are comprised in a plurality of tubes), and the second channel is referred to as the fluid flow path defined by the outer surface of the tube(s) and the shell of the heat exchanger such that the second fluid in the second channel flows over the outer surface of the tube(s).

It should be noted that the support structures are arranged in the respective first and second channel such that a fluid may circumvent the support structures. That is, the support structures extends over the entire channel height of the respective first and second channels (the first channel height of the first channel being the distance, such as the shortest distance, from the first channel wall portion to the first side of the second channel wall portion, and the second channel height of the second channel being the distance, such as the shortest distance, from the second side of the second channel wall portion to the third channel wall portion), but not over the entire width of the respective first and second channels. According to one embodiment, the first support structures extend in a fluid flow direction and perpendicularly from said first channel wall portion, inwardly into said first channel towards said second channel wall portion, and extends to said second channel wall portion in order to support the same and/or the second support structures extend in a fluid flow direction and perpendicularly from said second channel wall portion, inwardly into said second channel towards said third channel wall portion, and extends to said third channel wall portion in order to support the same.

According to one embodiment, at least the first channel wall portion, the second channel wall portion, the third channel wall portion, the plurality of first support structures and the plurality of second support structures are produced by additive manufacturing.

Hence, complex forms for e.g. the channels and the support structures may relatively easy be embodied. Moreover, computer based drawings (e.g. CAD drawings) may be used to instruct the additive manufacturing equipment directly, which may result in reduced manufacturing errors and better tolerances. Moreover, as the drawings easily can be change, corrected and/or improved, validation and verification of the design of the heat exchanger and its components are facilitated.

According to one embodiment, the additive manufacturing method is chosen from one of the following techniques: metal sintering or metal melting, such as e.g. selective laser sintering, direct metal laser sintering, selective laser melting. The material used during the additive manufacturing method is preferably a metal, e.g. aluminium, titanium, stainless steel, or steel. An example of titanium is titanium TA6V, and an example of stainless steel is 17-4 PH.

According to one embodiment, the heat exchanger is manufactured as a single unit. Here, additive manufacturing is preferably used. According to one embodiment, at least the first channel wall portion, the second channel wall portion, the third channel wall portion, the plurality of first support structures and the plurality of second support structures are produced as a single unit. According to one embodiment, at least the heat exchanger body is produced as a single unit. It should be understood that a plurality of independent single heat exchanging units may be manufactured and subsequently attached to each other to form a larger heat exchanger.

According to one embodiment, at least one support structure in said plurality of first and second support structures has a length extending along a longitudinal support structure axis, and has a width extending along a transversal support structure axis being perpendicular to said longitudinal support structure axis, wherein the width of said at least one support structure is smaller compared to the length of said at least one support structure.

Such shape of the at least one support structure affects the fluid flow in a desirable way compared to a support structure having a length which is larger compared to the width of the same, e.g. by inducing a lower pressure drop in the respective channel. The at least one support structure is sometimes simply referred to as "the support structure" for increased readability. Thus, the structure has a main extension along its longitudinal support structure axis, and a transversal extension along its transversal support structure axis. The transversal support structure axis is preferably extending through the support structure at its maximum width. The longitudinal support structure axis may coincide with the main extension of the channel in which it is arranged, and the transversal support structure axis may coincide with the width of the channel in which it is arranged.

According to one embodiment, said at least one support structure has a curved or rounded outer surface which guides and directs the fluid around the support structure in fluid flow desirable way, e.g. by inducing a lower pressure drop in the respective channel.

According to one embodiment, said at least one support structure is substantially symmetrically shaped along at least said longitudinal support structure axis.

Hereby, the support structure may affect the fluid flow in the first and/or second channels in a desirable way, e.g. by inducing a lower pressure drop in the respective channel. Moreover, for a symmetrical shape of the support structure the fluid flow behaviour around the support structure is more easily predicted. Hence, the fluid flow in the heat exchanger, and the corresponding heat transfer and pressure drop, may be more easily predicted.

According to one embodiment, the length of said at least one support structure is between 3 to 7 times the width of said at least one support structure.

Such length is preferable from a fluid flow perspective, e.g. by inducing a lower pressure drop in the respective channel. According to one embodiment, the length of said at least one support structure is between 4 to 6, or between 4.5 to 5.5 times the width of said at least one support structure.

According to one embodiment, said longitudinal support structure axis intersects with said transversal support structure axis to define an axis intersection point, wherein the length of said at least one support structure can be divided into a first length extending along the longitudinal support structure axis from said axis intersection point to a first longitudinal end of said at least one support structure, and divided into a second length extending along the longitudinal support structure axis from said axis intersection point to a second longitudinal end of said at least one support structure, wherein the first length is equal to, or smaller than the second length.

That is, for embodiments in which the first length is equal to the second length, the support structure may be symmetrically shaped along said transversal support structure axis. For embodiments in which the first length is smaller than the second length, the support structure is asymmetrically shaped along said transversal support structure axis. By having the first length smaller than the second length, or stated differently, the second length larger than the first length, the shape of the support structure is preferable from a fluid flow perspective.

Stated differently, the length of the support structure extends along the longitudinal support structure axis (i.e. in the longitudinal direction of the support structure), and the support structure may be geometrically divided into at least two portions, i.e. a first portion extending from said axis intersection point to said first longitudinal end of said at least one support structure, and a second portion extending from said axis intersection point to said second longitudinal end of said at least one support structure. Thus, the length of the first portion is equal to, or smaller than the length of second portion, i.e. the first portion is equal to, or shorter compared to said second portion.

It should be noted that the first and second length together forms the length, or the total length, of said at least one support structure.

According to one embodiment, said first length is between 1 to 4 times the width of said at least one support structure, and/or said second length is between 2 to 5 times the width of said at least one support structure.

According to one embodiment, said first length is between 1 to 2 times the width of said at least one support structure, and/or said second length is between 3 to 4 times the width of said at least one support structure.

Such relationship between the first length and the width, and the second length and the width, are preferable from a fluid flow perspective, e.g. by inducing a lower pressure drop in the respective channel. According to one embodiment, the second length is twice, or approximately twice the first length.

According to one embodiment, the height of said at least one support structure is between 5 mm and 35 mm, such as e.g. between 10 mm and 30 mm. According to one embodiment, the width of said at least one support structure is between 0.5 mm and 15 mm, such as e.g. between 1 mm and 10 mm, e.g. between 3 mm and 7 mm. The space between two adjacent support structures (for example in the direction along the transversal support structure axis, TSA) may e.g. be between 2 mm and 325 mm, e.g. between 3 mm and 20 mm, e.g. between 5 mm and 15 mm.

According to one embodiment, the height of the first channel and/or the second channel is between 5 mm and 35 mm, such as e.g. between 10 mm and 30 mm. According to one embodiment, the height of the first channel is the same as the height of the first support structures in said plurality of first support structures, an/or the height of the second channel is the same as the height of the second support structures in said plurality of second support structures. According to one embodiment, the width of the first channel and/or the width of the second channel is between 20 mm and 120 mm, such as e.g. between 25 mm and 100 mm, e.g. between 40 mm and 70 mm. According to one embodiment, the length of the first channel and/or the length of the second channel is between 500 mm and 2500 mm, such as e.g. between 600 mm and 2000 mm, e.g. between 1000 mm and 1500 mm.

According to one embodiment, said at least one support structures has a cross section which is lens-shaped or is elliptically shaped.

Such length is preferable from a fluid flow perspective. According to one embodiment, the at least one support structures has a cross section which is shaped as a droplet.

It should be noted that at least one of, or some of, or all of, the first support structures in said plurality of first support structures may be the same, or very similar to said at least one support structure. Correspondingly, at least one of, or some of, or all of, the second support structures in said plurality of second support structures may be the same, or very similar to said at least one support structure. According to one embodiment, each one of the first support structures in said plurality of first support structures is sized and dimensioned as said at least one support structure, and/or each one of the second support structures in said plurality of second support structures is sized and dimensioned as said at least one support structure.

According to one embodiment, said first channel is arranged such that said first fluid path has main first fluid flow direction, and said second channel is arranged such that said second fluid path has a main second fluid flow direction, and wherein said at least one support structure is arranged inside the first channel or the second channel such that the longitudinal support structure axis coincides with said main first fluid flow direction or said main second fluid flow direction, respectively.

Hence, the fluid flow in the respective channel flows along the respective first and second support structures, which is preferred from a desirable fluid flow perspective.

According to one embodiment, said at least one support structure is arranged inside the first channel or the second channel such that the longitudinal support structure axis is angled compared to said main first fluid flow direction or said main second fluid flow direction, respectively. Such angle may e.g. be between 1° and 90°, e.g. between 1° and 45°, such as between 1° and 20°, or between 1° and 10°, e.g. between 1° and 5°.

According to one embodiment, the first support structures in said plurality of first support structures is sized and dimensioned differently compared to the second support structures in said plurality of second support structures.

Hereby, the support structures may be adapted to the fluid flow in the first and second channels, respectively, and/or be adapted to any different fluid properties between the first and second fluid. That is, it may be advantageous to size and dimension the first support structures differently to the second support structures. For example, the first support structures may be sized and dimensioned in order to reduce the pressure drop in the first channel, while the second support structures may be sized and dimensioned in order to increase the turbulence of the second fluid in the second channel. Thus, the first support structures may e.g. be made thinner, i.e. with a smaller width, compared to the second support structures.

According to one embodiment, said first channel and said second channel are helically shaped around a center axis of the heat exchanger.

In other words, the heat exchanger may be a helically shaped heat exchanger having a center axis. Such shape of the heat exchanger is advantageous from a heat transfer perspective.

According to one embodiment, said plurality of first support structures are arranged in a spiral pattern configured to direct the first fluid in the first channel towards the center axis and/or wherein said plurality of second support structures are arranged in a spiral pattern configured to direct the second fluid in the second channel towards the center axis.

Hereby, the centrifugal forces of the first fluid and/or second fluid, which forces the fluid towards the periphery of the helically shaped first and second channel, respectively, are counteracted. According to one embodiment, the plurality of first support structures and/or the plurality of second support structures are arranged inside the first channel and the second channel respectively, in a helix formation. According to one embodiment, the spiral pattern, or helix formation, of the first support structures is such that there is a higher density of first support structures closer to the central axis of the helically shaped heat exchanger. According to one embodiment, the spiral pattern, or helix formation, of the second support structures is such that there is a higher density of second support structures closer to the central axis of the helically shaped heat exchanger.

According to one embodiment, the heat exchanger comprises a plurality of columns, e.g. at least four columns, of which each column is comprised of a heat exchanging unit such as the previously described helically shaped heat exchanger having a respective center axis. For example, in the four column case, the heat exchanger units may be arranged in a 2×2 matrix, having a center tube in which one of the first and second fluids may be guided. At one longitudinal end of the 2×2 matrix a distribution device distributing the first or the second fluid to each one of the four columns may be arranged. Such configuration may be beneficial from pressure drop and heat transfer perspective.

According to a second aspect of the invention, the object of the invention is achieved by an additive manufacturing method for manufacturing a heat exchanger according to claim 14.

According to the second aspect of the invention, the additive manufacturing method for manufacturing a heat exchanger comprises the steps of:

forming a first channel wall portion;

forming a plurality of first support structures extending from said first channel wall portion;

forming a second channel wall portion distant from said first channel wall portion, and supported by said plurality of first support structures, such that a first channel defining a first fluid path for a first fluid is defined by said first and second channel wall portion;

forming a plurality of second support structures extending from said second channel wall portion;

forming a third channel wall portion distant from said second channel wall portion, and supported by said plurality of second support structures, such that a second channel defining a second fluid path for a second fluid is defined by said second and third channel wall portion.

Effects and features of this second aspect of the present invention are largely analogous to those described above in connection with the first aspect of the invention. Embodiments mentioned in relation to the first aspect of the present invention are largely compatible with the second aspect of the invention, of which some embodiments are explicitly disclosed below. Thus, according to at least some embodiments, at least one support structure of said plurality of first and second support structures is formed as said at least one support structure described above with reference to the first aspect of the invention. That is, for example, an additive manufacturing method wherein at least one support structure of said first and second support structures is formed having a length extending along a respective longitudinal support structure axis, and is formed having a width extending along a respective transversal support structure axis being perpendicular to said longitudinal support structure axis, such that the width of said at least one support structure is smaller compared to the length of said at least one support structure, e.g. wherein said at least one support structure is formed to have a length of between 3 to 7 times the width of said at least one support structure.

According to one embodiment the additive manufacturing method comprises the step of forming said at least one support structure such that said longitudinal support structure axis intersects with said transversal support structure axis to define an axis intersection point, and wherein said at least one support structure is formed such that the length of said at least one support structure can be divided into a first length extending along the longitudinal support structure axis from said axis intersection point to a first longitudinal end of said at least one support structure, and divided into a second length extending along the longitudinal support structure axis from said axis intersection point to a second longitudinal end of said at least one support structure, wherein the first length is equal to, or smaller than the second length, e.g. such that said at least one support structure is formed such that the first length is between 1 to 2 times the length of said at least one support structure, and/or wherein said second length is between 3 to 4 times the length of said at least one support structure. For example, the step may comprise to form said at least one support structures such that it has a cross section which is lens-shaped or is elliptically shaped and/or to form said at least one support structures such that it has a round or curved outer surface.

It should be noted that in the step of forming a plurality of second support structures extending from said second channel wall portion, the second support structures are formed to extend from the second side of the second wall portion. Correspondingly, the first support structures connect to the first side of the second channel wall portion.

For example, said at least one support structure is formed in said first channel or second channel, such that the longitudinal support structure axis coincides with the main extension of the first channel or second channel, respectively. Effects of this embodiment is largely analogous to those described above in connection with the first aspect of the invention. According to one embodiment, said at least one support structure is formed in said first channel or second channel, such that the longitudinal support structure axis is angled with the main extension of the first channel or second channel, respectively. Such angle may be formed to be e.g. be between 1° and 90°, e.g. between 1° and 45°, such as between 1° and 20°, or between 1° and 10°, e.g. between 1° and 5°. Effects of this embodiment is largely analogous to those described above in connection with the first aspect of the invention.

For example, according to one embodiment, the method comprises the step of forming the second support structures in said plurality of second support structures differently compared to the first support structures in said plurality of first support structures. Effects of this embodiment is largely analogous to those described above in connection with the first aspect of the invention.

For example, and according to one embodiment, the method comprises the step of manufacturing the heat exchanger as a single unit. For example, the heat exchanger body may be formed as a one-piece heat exchanger body. Effects of this embodiment is largely analogous to those described above in connection with the first aspect of the invention.

According to one embodiment, the said first channel and said second channel are helically formed around a center axis of the heat exchanger. Effects of this embodiment is largely analogous to those described above in connection with the first aspect of the invention.

According to one embodiment, the method comprises the step of forming said plurality of first support structures in a spiral pattern to direct the first fluid in the first channel towards the center axis and/or forming said plurality of second support structures in a spiral pattern to direct the second fluid in the second channel towards the center axis. Effects of this embodiment is largely analogous to those described above in connection with the first aspect of the invention.

Further advantages and advantageous features of the invention are disclosed in the following description and in the dependent claims.

BRIEF DESCRIPTION OF THE DRAWINGS

The above, as well as additional objects, features and advantages of the present invention, will be better understood through the following illustrative and non-limiting detailed description of exemplary embodiments of the present invention, wherein.

DETAILED DESCRIPTION OF EXAMPLE EMBODIMENTS OF THE INVENTION

Figure 1:
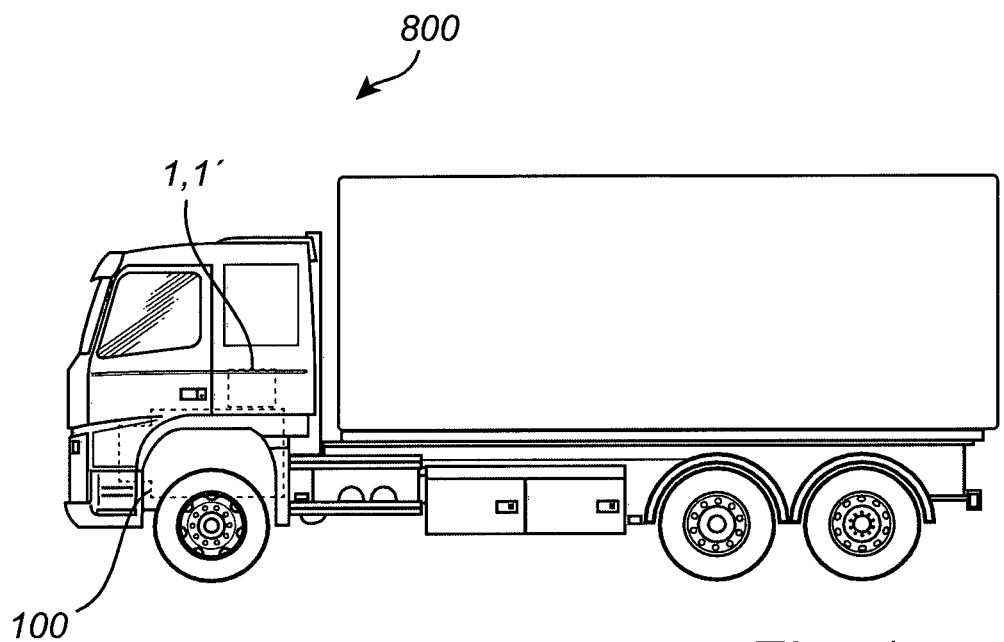
FIG. 1 is a side view of a vehicle comprising a heat exchanger according to an example embodiment of the present invention.

The present invention will now be described more fully hereinafter with reference to the accompanying drawings, in which an exemplary embodiment of the invention is shown. The invention may, however, be embodied in many different forms and should not be construed as limited to the embodiment set forth herein; rather, the embodiment is provided for thoroughness and completeness. Like reference character refer to like elements throughout the description.

With particular reference to FIG. 1, there is provided a vehicle 800 comprising a heat exchanger 1 according to one example of the present invention, and a combustion engine 100, such as e.g. an internal combustion engine 100. The vehicle 800 depicted in FIG. 1 is a truck 800 for which the inventive concept may be used with. However, the inventive concept may as well be used in another vehicle, such as e.g. a working machine such as e.g. a wheel loader or an excavator, or in another application such as e.g. in the processing industry or heat distribution industry.

Figure 2:
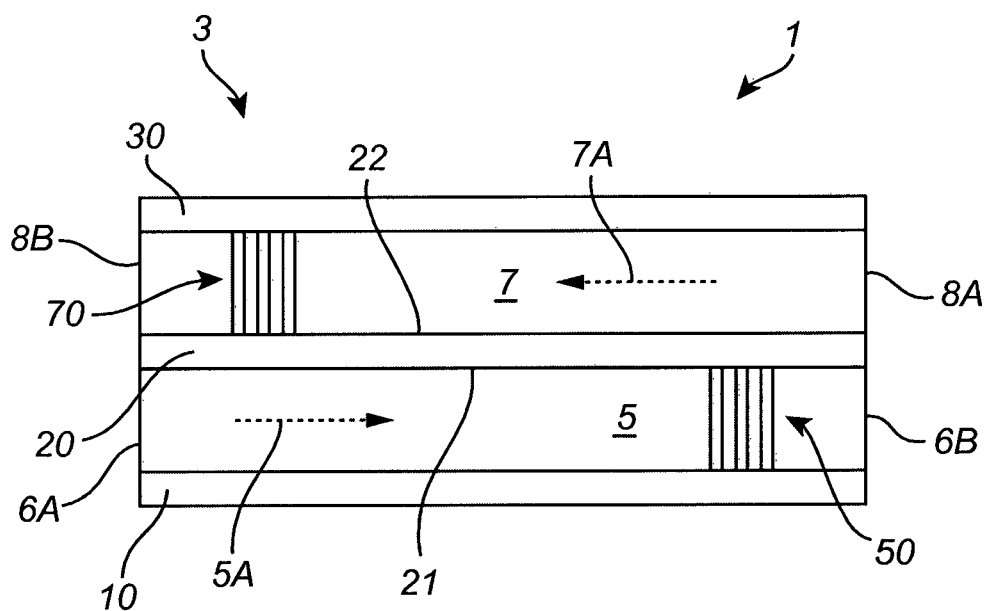
FIG. 2 is a schematic side view of a heat exchanger according to an example embodiment of the present invention.
Figure 3A:
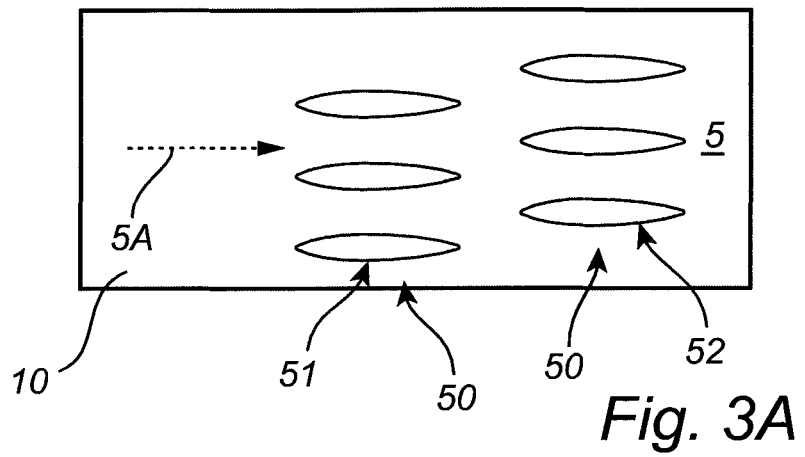
FIG. 3A is a top view of a first channel in the heat exchanger of FIG. 2, according to an example embodiment of the present invention.
Figure 3B:
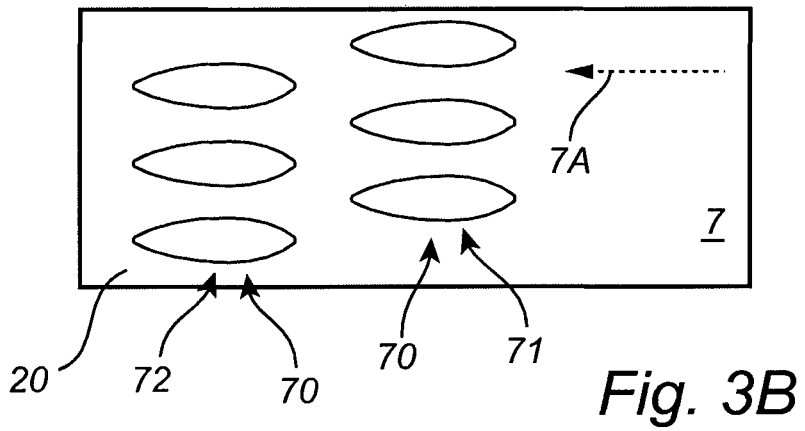
FIG. 3B is a top view of a second channel in the heat exchanger of FIG. 2, according to an example embodiment of the present invention.

A general concept of the heat exchanger 1 of the invention will now be described with reference to FIG. 2 showing a schematic side view of the heat exchanger 1, together with FIGS. 3A and 3B, showing schematic top views of a first and second channels in the heat exchanger 1, respectively.

In the non-limiting example of FIG. 2, the heat exchanger 1 comprises a heat exchanger body 3 and a first channel 5 and a second channel 7. The heat exchanger body 3 comprises at least a first channel wall portion 10 and a second channel wall portion 20. The first channel wall portion 10 is distant from the second channel wall portion 20 and at least partly defines the first channel 5. The first channel 5 comprises a first channel inlet 6A for receiving a first fluid, and a first channel outlet 6B for discharging the first fluid out of the first channel 5. The first channel 5 typically has a main extension in the longitudinal direction of the channel, which in FIG. 2 is from the first channel inlet 6A towards the first channel outlet 6B, and the first channel 5 having a first channel height which extends from the first channel wall portion 10 to the second channel wall portion 20.

The heat exchanger body 3 further comprises a third channel wall portion 30 which is distant from the second channel wall portion 20, and arranged on an opposite side of the second channel wall portion 20 as compared to the first channel wall portion 10. The second channel wall portion 20 and the third channel wall portion 30 at least partly define the second channel 7. Correspondingly to the first channel 5, the second channel 7 comprises a second channel inlet 8A for receiving a second fluid, and a second channel outlet 8B for discharging the second fluid out of the second channel 7. The second channel 7 typically has a main extension in the longitudinal direction of the channel, which in FIG. 2 is from the second channel inlet 8A towards the second channel outlet 8B, and the second channel 7 having a second channel height which extends from the second channel wall portion 20 to the third channel wall portion 30.

The second channel wall portion 20 comprises at least a first side 21 facing the first channel 5, and at least a second side 22 facing the second channel 7. In other words, the second channel wall portion 20 is shared by the first and second channels 5, 7 and heat may be transferred through the second channel wall portion 20 in order to exchange heat between first and second fluids in the first and second channels 5, 7, respectively. The first side 21 and the second side 22 of the second channel wall portion 20 are arranged to face in different directions compared to each other, for example an angle between a surface normal of the first side 21 and a surface normal of the second side 22 may be between 90° to 270°, or between 130° and 230°, or e.g. approximately 180°. In the latter case, the first side 21 is directly opposite to the second side 22.

Moreover, the heat exchanger 1 comprises a plurality of first support structures 50, of which, for illustrative purposes, only three are shown in FIG. 2, and only six are shown in FIG. 3A. Each of the first support structures 50 extends from the first channel wall portion 10, through the first channel 5, and up to, and connecting to, the second channel wall portion 20, or rather the first side 21 of the second channel wall portion 20. In other words, the first support structures 50 are arranged in the first channel 5 and supports the second channel wall portion 20. As is more clearly shown in FIG. 3A, which schematically illustrates the first channel 5 from above, the first support structures 50 do not extend over the entire width of the first channel 5, but are spaced apart from each other in order to enable the first fluid to flow passed the first support structures 50.

Correspondingly, the heat exchanger 1 comprises a plurality of second support structures 70, of which, for illustrative purposes, only three are shown in FIG. 2, and only six are shown in FIG. 3B. Each of the second support structures 70 extends from the second channel wall portion 20, or rather the second side 22 of the second channel wall portion 20, through the second channel 7, and up to, and connecting to, the third channel wall portion 30. In other words, the second support structures 70 are arranged inside the second channel 7 and support the third channel wall portion 30. As is more clearly shown in FIG. 3B, which schematically illustrates the second channel 7 from above, the second support structures 70 do not extend over the entire width of the second channel 7, but are spaced apart from each other in order to enable the second fluid to flow passed the second support structures 70.

It should be noted that the first and second support structures 50, 70 primarily supports the second and third channel wall portions 20, 30, respectively, during manufacturing of the heat exchanger 1, which will be further described below with reference to FIG. 6, but which is briefly discussed here as well. The plurality of first support structures 50 are configured to support the second wall portion 20 in the first channel 5 during manufacturing of the heat exchanger 1. That is, when manufacturing the heat exchanger 1, the second channel wall portion 20 is supported by the plurality of first support structures 50, and may thus more easily be desirably manufactured. Correspondingly, the plurality of second support structures 70 are configured to support the third wall portion 30 in the second channel 7 during manufacturing of the heat exchanger 1. That is, when manufacturing the heat exchanger 1, the third channel wall portion 30 is supported by the plurality of second support structures 70, and may thus more easily be desirably manufactured. Of course, more channels and more associated channel wall portions and support structures may be provided to increase the size of the heat exchanger 1. As will be further described below with reference to e.g. FIGS. 3A, 3B and FIG. 4, the first and second support structures 50, 70 are configured to affect the fluid flow in the first and second channel 5, 7, respectively, such that the heat transfer between the first fluid and the second fluid of the heat exchanger 1 is increased and/or in that the pressure drop in the respective first and second channels 5, 7 is reduced. Hence, the first and second support structures 50, 70 which are used for supporting the second and third channel wall portions 20, 30, respectively, are formed and designed in a fluid flow desirable way. Further, the support structures 50, 70 may transfer heat between the first channel 5 and the second channel 7, i.e. between the first and second fluids, and thus increase the area available for heat transfer in the heat exchanger 1.

The first channel 5, and the corresponding first and second wall portions 10, 20 as well as the plurality of first support structures 50, define a first fluid path, indicated with dashed arrow 5A, for the first fluid. Correspondingly, the second channel 7, and the corresponding second and third wall portions 20, 30 as well as the plurality of second support structures 70, define a second fluid path, indicated with dashed arrow 7A, for the second fluid. As shown in FIG. 2, the first and second channels 5, 7 of the heat exchanger 1 are arranged in a counter-flow arrangement, that is the main first fluid flow direction of the first fluid in the first channel 5, i.e. the main direction of the first fluid path 5A, is opposite, or counter, to the main second fluid flow direction of the second fluid in the second channel 7, i.e. the main direction for the second fluid path 7A. Hereby, heat can be exchanged in an efficient manner, by being transferred from e.g. the first fluid in the first channel 5 to the first side 21 of the second channel wall portion 20, through the second channel wall portion 20, and further to the second fluid in the second channel 7 via the second side 22 of the second channel wall portion 20.

In FIGS. 3A and 3B example embodiments of the invention in which the plurality of first support structures 50 are arranged inside the first channel 5 such that the respective longitudinal support structure axis of the first support structures 50, coincides with the main fluid flow direction of the first fluid (i.e. the main first fluid flow direction indicated by dashed arrow 5A), and in which the plurality of second support structures 70 are arranged inside the second channel 7 such that a respective longitudinal support structure axis of the second support structures 70, coincides with the main fluid flow direction of the second fluid (i.e. the main second fluid flow direction indicated by dashed arrow 7A), are shown. Hence, the main fluid flow direction of the respective first and second fluid will coincide with the main extension of the respective support structure in the plurality of first and second support structures 50, 70, in the fluid flow may be affected in a desirable way.

In FIG. 3A, three first support structures 50 form a first row 51, and three other first support structures 50 form a second row 52 arranged downstream of the first row 51 in the first channel 5. As shown in FIG. 3A the first and the second rows 51, 52 in the first channel 5 are not in line, but staggered, or parallel adjusted, to each other. Hereby, the first fluid in the first channel 5 is better mixed and/or a more preferred turbulence generation of the first fluid is achieved, as the first fluid path 5A is forced to zig-zag between the first support structures 50, and thus more often encounter the longitudinal end of the respective first support structures 50, compared to if the first and second rows 51, 52 were in line with each other.

Correspondingly, In FIG. 3B, three second support structures 70 form a first row 71, and three other second support structures 70 form a second row 72 arranged downstream of the first row 71 in the second channel 7. Similar to FIG. 3A, as shown in FIG. 3B the first and the second rows 71, 72 in the second channel 7 are not in line, but staggered, or parallel adjusted, to each other. Hereby, the first fluid in the second channel 7 is better mixed and/or a more preferred turbulence generation of the second fluid is achieved, as the second fluid path 7A is forced to zig-zag between the second support structures 70, and thus more often encounter the longitudinal end of the respective second support structures 70, compared to if the first and second rows 71, 72 were in line with each other.

As also shown in FIGS. 3A and 3B, the first support structures 50 in the first channel 5 are sized and dimensioned differently compared to the second support structures 70 of the second channel 7. Hereby, the support structures 50, 70 may be adapted to the fluid flow in the first and second channels 5, 7, and/or be adapted to any different fluid properties between the first and second fluid. For example, the first support structures 50 may be sized and dimensioned in order to reduce the pressure drop in the first channel 5, while the second support structures 70 may be sized and dimensioned in order to increase the turbulence of the second fluid in the second channel 7. Thus, the first support structures 50 may e.g. be made thinner, i.e. with a smaller width Dh, compared to the second support structures 70.

Figure 4:
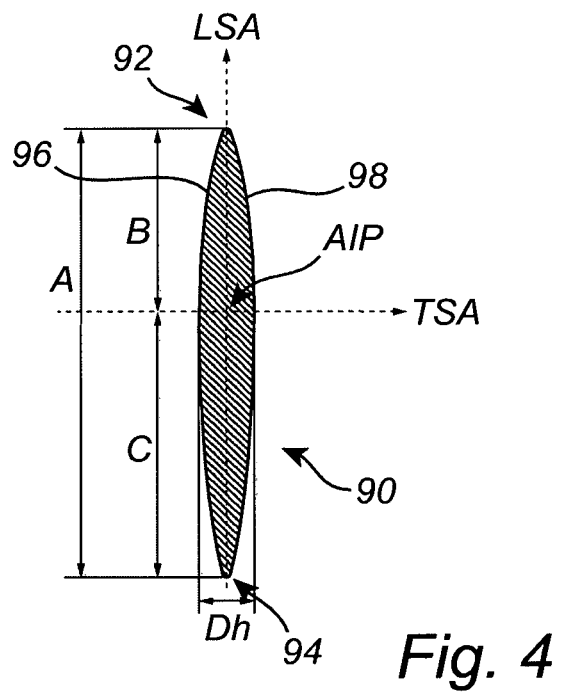
FIG. 4 shows a cross section of a support structure comprised in a heat exchanger according to an example embodiment of the invention.

Turning to FIG. 4, showing a cross sectional view of one support structure 90 of the plurality of first support structure 50 and/or of the plurality of second support structures 70. The support structure 90 has a length A extending along a longitudinal support structure axis LSA of the support structure 90, and has a width Dh (which may be referred to as a hydraulic diameter Dh) extending along a transversal support structure axis TSA of the support structure 90. The transversal support structure axis TSA is perpendicular to the longitudinal support structure axis LSA. As shown in FIG. 4, the width Dh of the support structure 90 is smaller compared to the length A of the support structure 90. According to one embodiment the length A of the support structure 90 is between 3 to 7 times the width Dh of the support structure 90. In other words, the support structure 90 has a main extension in the longitudinal direction. Hereby, the fluid flow may be desirably affected. Furthermore, the support structure 90 may symmetrically shaped, or substantially symmetrically shaped, along the longitudinal support structure axis LSA.

Moreover, the support structure 90 comprises an axis intersection point AIP defined by the intersection of the longitudinal support structure axis LSA and the transversal support structure axis TSA. As seen in FIG. 4, the length A of the support structure 90 can be divided into a first length B extending along the longitudinal support structure axis LSA from the axis intersection point AIP to a first longitudinal end 92 of the support structure 90, and divided into a second length C extending along the longitudinal support structure axis LSA from the axis intersection point AIP to a second longitudinal end 94 of the support structure 90. The first length B may be equal, or substantially equal, to the second length C, as shown in e.g. FIGS. 3A and 3B. However, as shown in FIG. 4, the first length B may preferably be smaller than the second length C.

According to one embodiment, the first length B is between 1 to 2 times the width Dh of the support structure 90. According to one embodiment, the second length C is between 3 to 4 times the width the support structure 90.

As shown in FIG. 4, the support structure 90 is lens-shaped or is elliptically shaped, i.e. the support structure 90 has a cross section which is lens-shaped or which is elliptically shaped. Hence, a first outer boundary portion 96 from the first longitudinal end 92 to the second longitudinal end 94 is curved in a predetermined way, and a second outer boundary portion 98 from the first longitudinal end 92 to the second longitudinal end 94 is curved in a predetermined way. It should be noted that the support structure 90 may comprise the predetermined curved first and second outer boundary portions 96, 98 without being lens-shaped or elliptically shaped. As the support structure 90 in FIG. 4 is symmetrical along its longitudinal support structure axis LSA, the first and second boundary portions 96, 98 are equally curved. Thus, the support structure 90 has a maximum width coinciding with the transversal support structure axis TSA.

It should be noted that each one of the first support structures 50 in the plurality of first support structures 50 may be sized and dimensioned as the support structure 90 of FIG. 4. Additionally or alternatively, each one of the second support structures 70 in the plurality of second support structures 70 may be sized and dimensioned as the support structure 90 of FIG. 4.

Figure 5A:
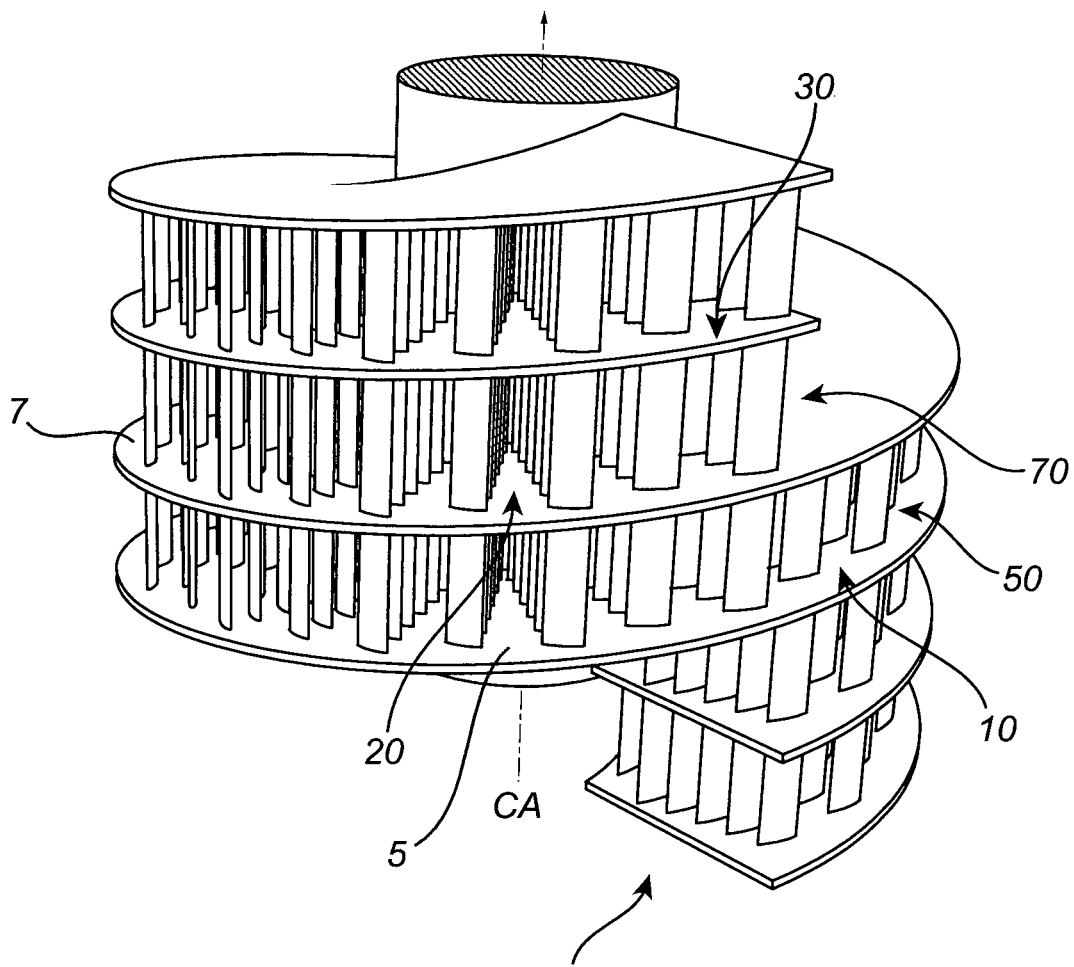
FIG. 5A is a perspective view of a heat exchanger according to an example embodiment of the present invention.

FIG. 5A shows a heat exchanger 1' according to one example embodiment of the invention. The features of the heat exchanger 1', such as the first, second and third channel wall portions 10, 20, 30 as well as the plurality of first and second support structures 50, 70, are the same, or very similar, to the schematic examples shown in FIG. 2 and FIGS. 3A and 3B, why the same reference numerals are used for corresponding features in FIG. 5A. However, as is shown in FIG. 5A, the heat exchanger 1' is helically shaped. Thus, the first channel 5 and the second channel 7 are helically shaped around a center axis CA of the heat exchanger 1'. The helical shape provides a beneficial heat transfer between the first fluid in the first channel 5, and the second fluid in the second channel 7. As can be seen in FIG. 5A, the first and second channels 5, 7 spiral around the center axis CA, and thus, a portion of the second channel 7 is, along the center axis CA, arranged between two portions of the first channel 5 (in other words, in FIG. 5A, the third channel wall portion 30 will act as support for the first support structures 50 in the portion of the first channel 5 arranged above the portion of the second channel 7).

Figure 5B:
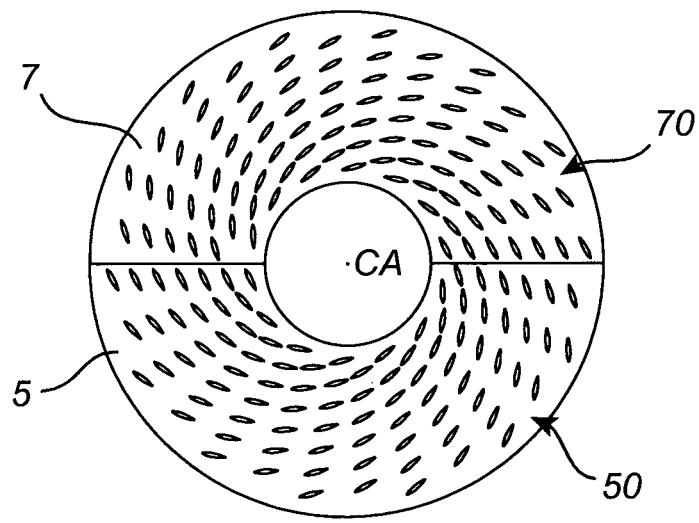
FIG. 5B shows a top view of a first channel in the heat exchanger of FIG. 5A and its associated first support structures, and a top view of a second channel in the heat exchanger of FIG. 5A and its associated second support structures, according to example embodiments of the present invention.

FIG. 5B, showing a top view of a portion of the first channel 5 in the lower half of FIG. 5B, or more specifically half a revelation of the helically shaped first channel 5, and a top view. of a portion of the second channel 7 in the upper half of FIG. 5B, or more specifically half a revelation of the helically shaped second channel 7. As shown in FIG. 5B, the plurality of first support structures 50 are arranged in a spiral pattern in the first channel 5. The spiral pattern of the first support structures 50 provide a higher density of first support structures 50 closer to the central axis CA. By the pattern, the plurality of first support structures 50 direct the first fluid in the first channel 5 towards the center axis CA of the heat exchanger 1', thus counteracting the centrifugal forces pressing the first fluid to an outer boundary portion of the helically shaped first channel 5. Moreover, as can be seen for at least some of the first support structures 50, the respective longitudinal support structure axis LSA needs not to coincide with the main fluid flow direction of the first fluid, as some of the first support structures 50 may be directed with its longitudinal support structure axis LSA closer to the central axis CA, as compared to the main fluid flow direction of the first fluid. Correspondingly, as also shown in FIG. 5B, the plurality of second support structures 70 are arranged in a spiral pattern in the second channel 7. The spiral pattern of the second support structures 70 provide a higher density of second support structures 70 closer to the central axis CA. By the pattern, the plurality of second support structures 70 direct the second fluid in the second channel 7 towards the center axis CA of the heat exchanger 1', thus counteracting the centrifugal forces pressing the second fluid to an outer boundary portion of the helically shaped second channel 5. Similar to some of the first support structures 50, at least some of the second support structures 70, may be directed with its longitudinal support structure axis LSA closer to the central axis CA, as compared to the main fluid flow direction of the second fluid, i.e. the respective longitudinal support structure axis LSA needs not to coincide with the main fluid flow direction of the second fluid.

The present invention also relates to an additive manufacturing method for manufacturing a heat exchanger, such as the heat exchanger 1 of FIG. 2, and the heat exchanger 1' of FIG. 5A, as well as the example support structure 90 of FIG. 4. Thus, the present invention will hereafter be described with reference to the above described heat exchangers 1, 1', in a non-limiting way, with reference to the flow-chart in FIG. 6 (hence, the reference numerals of FIG. 2, FIG. 4 and FIG. 5A are used below when describing the steps of the method in the flow-chart of FIG. 6).

In a first step s1 a first channel wall portion 10 is formed by additive manufacturing.

In a second step s2, a plurality of first support structures 50 extending from the first channel wall portion 10 is formed by additive manufacturing.

In a third step s3, a second channel wall portion 20 is formed by additive manufacturing distant from the first channel wall portion 10. The formation of the second channel wall portion 20 is facilitated and is supported by the plurality of first support structures 50 extending from the first channel wall portion 10. In the third step, a first channel 5 is formed in the space between the first channel wall portion 10, the first support structures 50 and the second channel wall portion 20, thus defining a first fluid path for a first fluid.

In a fourth step s4, a plurality of second support structures 70 extending from the second channel wall portion 20 is formed by additive manufacturing. The formation of the second support structures 70 is carried out from a different side of the second channel wall portion 20 as compared to a side of the second channel wall portion 20 to which the first support structures 50 are connected. In other words, the first support structures 50 connects, and extends, to the first side 21 of the second channel wall portion 20, while the second support structures 70 connects to, and extends from, the second side 22 of the second channel wall portion 20.

In a fifth step s5, a third channel wall portion 30 is formed by additive manufacturing distant from the second channel wall portion 20. The formation of the third channel wall portion 30 is facilitated and is supported by the plurality of second support structures 70 extending from the second side 22 of the second channel wall portion 20. In the fifth step, a second channel 7 is formed in the space between the second channel wall portion 20, the second support structures 70 and the third channel wall portion 30, thus defining a second fluid path for a second fluid.

Thus, at least the first channel wall portion 10, the second channel wall portion 20, the third channel wall portion 30, the plurality of first support structures 50 and the plurality of second support structures 70 may be produced by additive manufacturing, and preferably manufactured as a single unit. According to one embodiment, the heat exchanger 1, 1' is manufactured as a single unit.

It should be understood that the above steps s1-s5 may be carried out in such a way that a helically formed heat exchanger 1' is manufactured. Hence, the first channel 5 and the second channel 7 may be helically formed around the center axis CA of the helically formed heat exchanger 1'. Moreover, in the second step s2 and/or the fourth step s4, the plurality of first support structures 50 may be formed in a spiral pattern to direct the first fluid in the first channel towards the center axis CA of the heat exchanger 1' and/or the plurality of second support structures 70 may be formed in a spiral pattern to direct the second fluid in the second channel towards the center axis CA of the heat exchanger 1', as described with reference to FIG. 5B.

It should be noted that in the second step s2 and/or the fourth step s4, any one of, or some of, or all of, the support structures in the plurality of first support structures 50 and/or in the plurality of second support structures 70, may be formed by additive manufacturing to correspond to the support structure 90 described with reference to FIG. 4.

Moreover, in the second step s2 and/or the fourth step s4, any one of, or some of, or all of, the support structures in the plurality of first support structures 50 and/or in the plurality of second support structures 70, may be formed such that the respective longitudinal support structure axis LSA coincides with the main extension of the first channel 5 or second channel 7, respectively.

According to one embodiment, the second step s2 and the fourth step s4, are adapted such that the first support structures 50 in the plurality of first support structures 50 are sized and dimensioned differently to the second support structures 70 in the plurality of second support structures 70.

Figure 6:
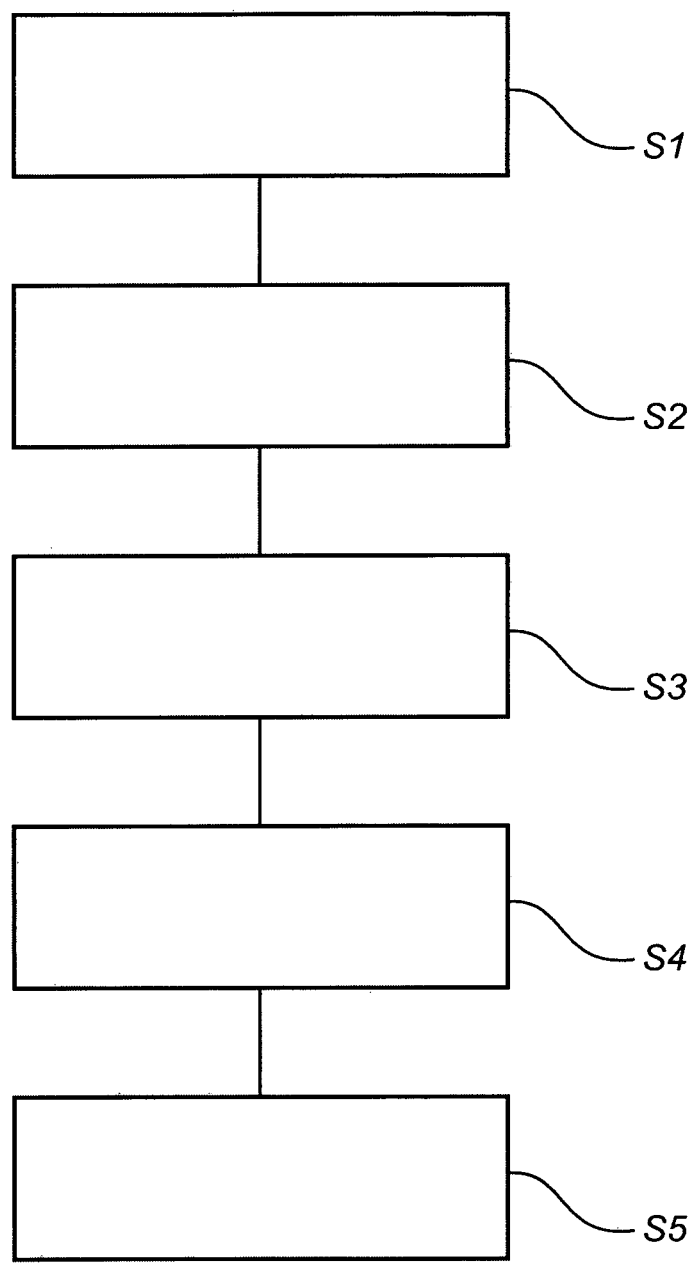
FIG. 6 is a flow chart describing the steps of an additive manufacturing method for manufacturing a heat exchanger according to an example embodiment of the invention.

It should further be noted that the vehicle 800 if FIG. 1 may comprise the heat exchanger 1 of FIG. 2, or the heat exchanger 1' of FIG. 5A, and may be manufactured by the method described in the flow-chart with reference to FIG. 6.

It is to be understood that the present invention is not limited to the embodiments described above and illustrated in the drawings; rather, the skilled person will recognize that many changes and modifications may be made within the scope of the appended claims.

The invention claimed is:

1. A heat exchanger comprising:
a heat exchanger body comprising at least a first channel wall portion, a second channel wall portion, and a third channel wall portion, a first channel defining a first fluid path for a first fluid, said first channel having a first channel height extending from said first channel wall portion to said second channel wall portion;
a second channel defining a second fluid path for a second fluid, said second channel having a second channel height extending from said second channel wall portion to said third channel wall portion such that heat is allowed to be transferred between the first channel and the second channel via said second channel wall portion;
a plurality of first support structures arranged in said first channel and extending from said first channel wall portion to said second channel wall portion, and a plurality of second support structures arranged in said second channel and extending from said second channel wall portion to said third channel wall portion,
wherein said plurality of first support structures are configured to support said second channel wall portion in said first channel, and that said plurality of second support structures are configured to support said third channel wall portion in said second channel, during manufacturing of the heat exchanger and in that said first channel and said second channel are helically shaped and spiral around a center axis of the heat exchanger, the plurality of support structures being arranged in the first channel in a curved spiral pattern configured to direct the first fluid in the first channel towards the center axis, the curved spiral pattern of the first support structures being such that there is a higher density of first support structures closer to the central axis of heat exchanger, and the plurality of the second support structures being arranged in the second channel in a curved spiral pattern configured to direct the second fluid in the second channel towards the center axis, the curved spiral pattern of the second support structures being such that there is a higher density of second support structures closer to the central axis of heat exchanger.

2. The heat exchanger according to claim 1, wherein at least the first channel wall portion, the second channel wall portion, the third channel wall portion, the plurality of first support structures and the plurality of second support structures are produced by additive manufacturing.

3. The heat exchanger according to claim 1, wherein at least one support structure in said plurality of first and second support structures has a length extending along a longitudinal support structure axis (LSA), and has a width extending along a transversal support structure axis (TSA) being perpendicular to said longitudinal support structure axis, wherein the width of said at least one support structure is smaller compared to the length of said at least one support structure.

4. The heat exchanger according to claim 3, wherein said at least one support structure is symmetrically shaped along at least said longitudinal support structure axis.

5. The heat exchanger according to claim 3, wherein the length of said at least one support structure is between 3 to 7 times the width of said at least one support structure.

6. The heat exchanger according to claim 3, wherein said longitudinal support structure axis intersects with said transversal support structure axis to define an axis intersection point (AIP), and wherein the length of said at least one support structure is divided into a first length extending along the longitudinal support structure axis from said axis intersection point to a first longitudinal end of said at least one support structure, and divided into a second length extending along the longitudinal support structure axis from said axis intersection point to a second longitudinal end of said at least one support structure, wherein the first length is equal to, or smaller than the second length.

7. The heat exchanger according to claim 6, wherein said first length is between 1 to 2 times the width of said at least one support structure, and/or wherein said second length is between 3 to 4 times the width of said at least one support structure.

8. The heat exchanger according to claim 1, wherein at least one support structures in said plurality of first and second support structures has a cross section which is lens-shaped or is elliptically shaped.

9. The heat exchanger according to claim 1, wherein said first channel is arranged such that said first fluid path has a main first fluid flow direction, and said second channel is arranged such that said second fluid path has a main second fluid flow direction, and wherein at least one support structure in said plurality of first and second support structures is arranged inside the first channel or the second channel such that a longitudinal support structure axis coincides with said main first fluid flow direction or said main second fluid flow direction, respectively.

10. The heat exchanger according to claim 1, wherein the first support structures in said plurality of first support structures is sized and dimensioned differently compared to the second support structures in said plurality of second support structures.

11. The heat exchanger according to claim 1, wherein the heat exchanger is manufactured as a single unit.

12. An additive manufacturing method for manufacturing a heat exchanger according to claim 1, the method comprising: forming the first channel wall portion; forming a plurality of first support structures extending from said first channel wall portion; forming the second channel wall portion distant from said first channel wall portion, and supported by said plurality of first support structures, such that the first channel defining the first fluid path for the first fluid is defined by said first and second channel wall portion; forming a plurality of second support structures extending from said second channel wall portion; forming the third channel wall portion distant from said second channel wall portion, and supported by said plurality of second support structures, such that the second channel defining the second fluid path for the second fluid is defined by said second and third channel wall portion.

13. An additive manufacturing method according to claim 12, wherein said at least one support structure is formed in said first channel or second channel, such that the longitudinal support structure axis coincides with the main extension of the first channel or second channel, respectively.

14. An additive manufacturing method according to claim 12, comprising the step of forming the second support structures in said plurality of second support structures differently compared to the first support structures in said plurality of first support structures.

15. An additive manufacturing method according to claim 12, wherein said heat exchanger is manufactured as a single unit.

16. A vehicle comprising a heat exchanger according to claim 1.

* * * * *